Figure 1:
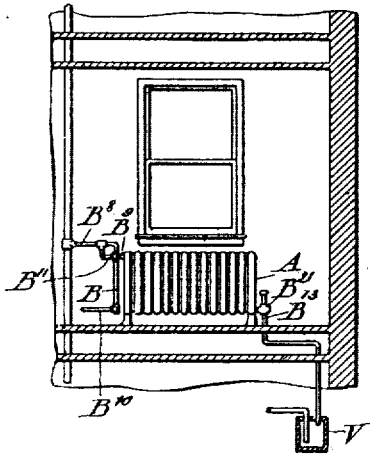

No. 851,363. PATENTED APR. 23, 1907.
H. C. MALLORY.
HEATING SYSTEM.
APPLICATION FILED NOV. 24, 1906.

6 SHEETS—SHEET 1.

WITNESSES:

INVENTOR
Harry C. Mallory
BY
ATTORNEY.

No. 851,363. PATENTED APR. 23, 1907.
H. C. MALLORY.
HEATING SYSTEM.
APPLICATION FILED NOV. 24, 1906.

6 SHEETS—SHEET 2.

WITNESSES:

INVENTOR

BY

ATTORNEY.

No. 851,363. PATENTED APR. 23, 1907.
H. C. MALLORY.
HEATING SYSTEM.
APPLICATION FILED NOV. 24, 1906.
6 SHEETS—SHEET 3.
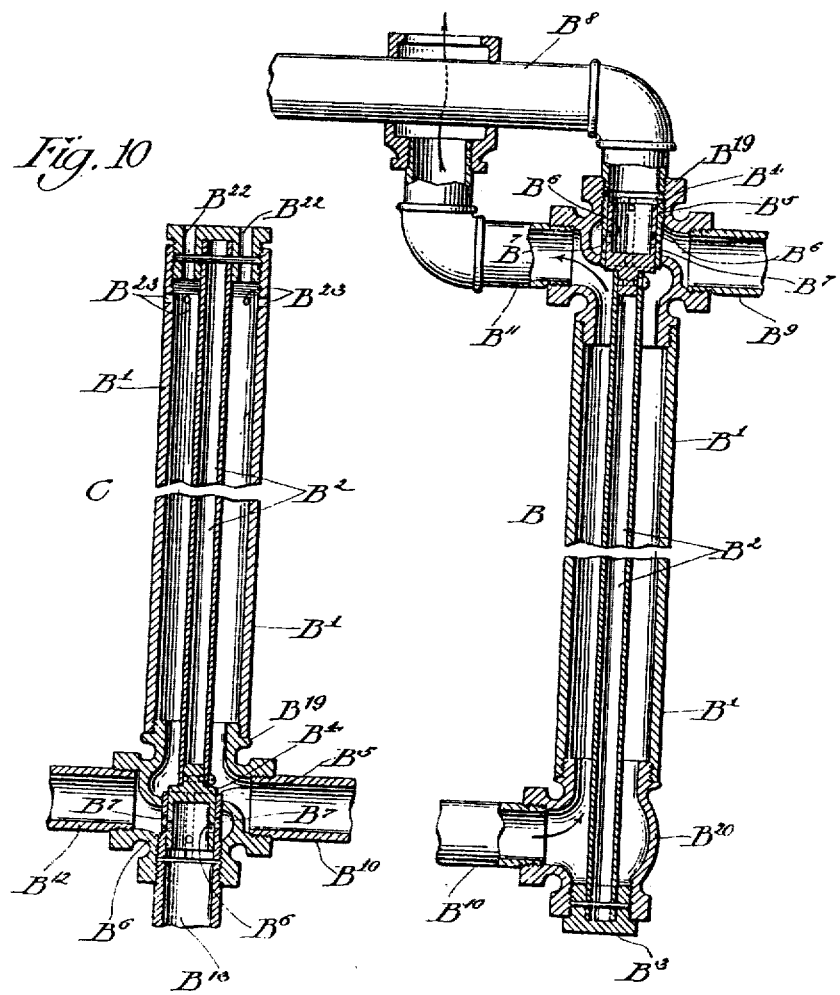
WITNESSES:
INVENTOR
Harry C. Mallory
BY
ATTORNEY.

No. 851,363. PATENTED APR. 23, 1907.
H. C. MALLORY.
HEATING SYSTEM.
APPLICATION FILED NOV. 24, 1906.
6 SHEETS—SHEET 4.
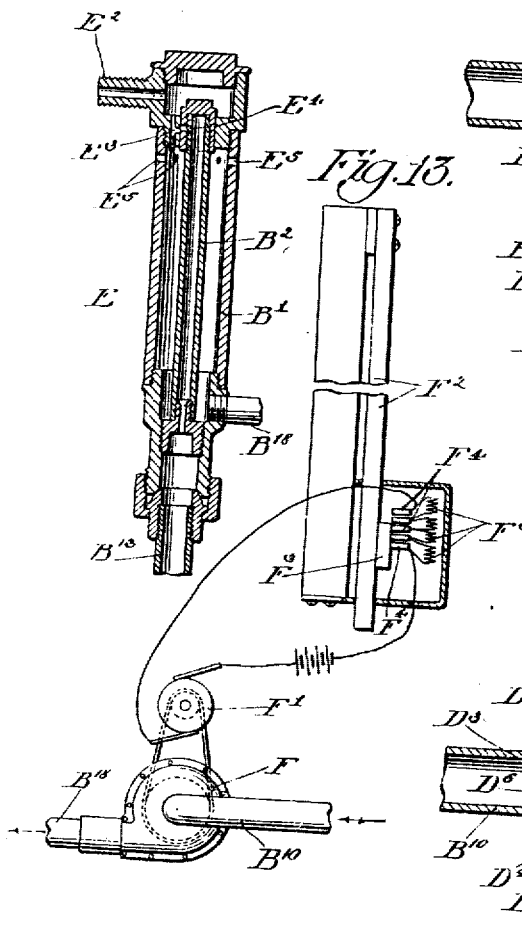
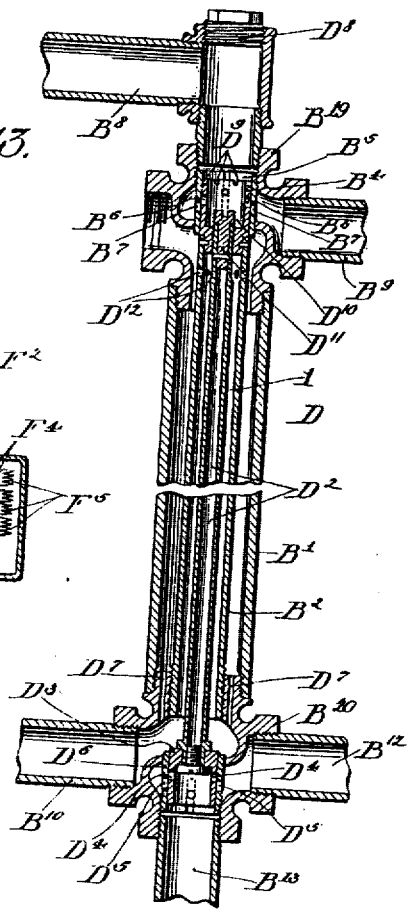

No. 851,363.  
PATENTED APR. 23, 1907.  
H. C. MALLORY.  
HEATING SYSTEM.  
APPLICATION FILED NOV. 24, 1906.

6 SHEETS—SHEET 5.

WITNESSES:

INVENTOR
Harry C. Mallory
BY
ATTORNEY.

No. 851,363.  
PATENTED APR. 23, 1907.

H. C. MALLORY.  
HEATING SYSTEM.  
APPLICATION FILED NOV. 24, 1906.

6 SHEETS—SHEET 6.

WITNESSES:

INVENTOR  
Harry C. Mallory  
BY  
Francis T. Chambers  
his ATTORNEY.

UNITED STATES PATENT OFFICE.

HARRY C. MALLORY, OF NEW YORK, N. Y.

HEATING SYSTEM.

No. 851,363.   Specification of Letters Patent.   Patented April 23, 1907.

Application filed November 24, 1906. Serial No. 344,821.

*To all whom it may concern:*

Be it known that I, HARRY C. MALLORY, a citizen of the United States of America, residing in the city, county, and State of New York, have invented a certain new and useful Improvement in Heating Systems, of which the following is a true and exact description, reference being had to the accompanying drawings, which form a part thereof.

My present invention relates to heating systems such as are employed in heating buildings, and has for its object improvements in the means for regulating the heating capacity or effect of the heating devices or radiators.

My invention is particularly designed for controlling steam radiators, though it is by no means limited in all of its aspects to use with steam radiators but may be used where hot water or other fluid heating agent is employed.

One of the features of my invention consists in subjecting the thermostatic actuating mechanism employed for controlling the flow of the heating fluid through the heating devices to the action of a stream of a fluid temperature changing agent which is caused to flow against it and by the thermostatic actuating mechanism, changing the temperature of the latter in passing.

Another feature of my invention consists in varying the heat radiating capacity of a heat radiating unit in response to variations in the external temperature.

A third feature of my invention consists in varying the capacity of a heat radiator in response to variations of the external temperature and further varying the capacity of the radiator in response to the temperature of the apartment to be heated.

A fourth feature of my invention consists in drawing the stream of fluid acting thermally on the thermostatic actuating mechanism of the control valve into the low pressure return pipe of the heating system.

All of the above enumerated features of my invention are present in the preferred form of apparatus for carrying out my invention in which I draw a stream of air from the external atmosphere through a chamber containing, or in proximity to, the thermostatic actuating mechanism of the control valve into the low pressure return conduit leading from the radiator and employ a thermostatic pilot valve governed by the temperature of the apartment to be heated for governing the flow of said stream of air. It will be readily understood, however, especially in view of the following descriptive matter and the drawings, that some features of my invention may be employed without a corresponding use of other features. It should be remarked, however, that while the controlling valve mechanism may act to directly control the supply of steam or other heating fluid to the radiator or the escape of air, steam, water of condensation etc. from the radiator or may control jointly the supply of heating fluid to, and its escape from the radiator, I prefer to employ in such valve mechanism a throttling valve or valves in preference to valves such as fluid motor valves which are either shut tight or wide open, and in some arrangements I regard it as essential that the controlling valves shall be throttling valves in order to obtain a gradual variation of the rate of flow of the heating fluid.

The various features of novelty which characterize my invention are pointed out with particularity in the claims annexed to and forming a part of this specification. For a better understanding of my invention and some of the advantages possessed by it and some of the ways in which it may be carried out, however, reference should be had to the accompanying drawings and descriptive matter in which I have illustrated and described somewhat in detail various embodiments of my invention.

Figure 3:
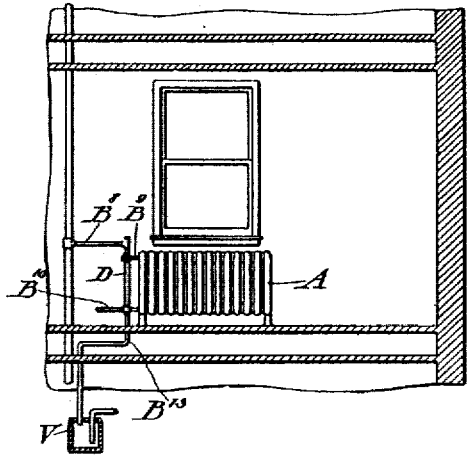
Figure 2:
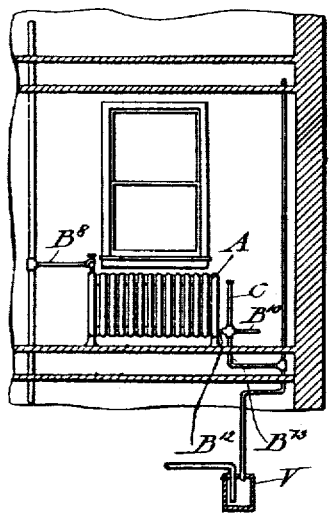
Figure 4:
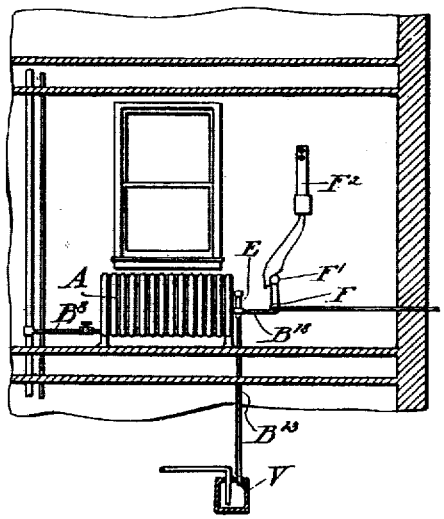
Figure 5:
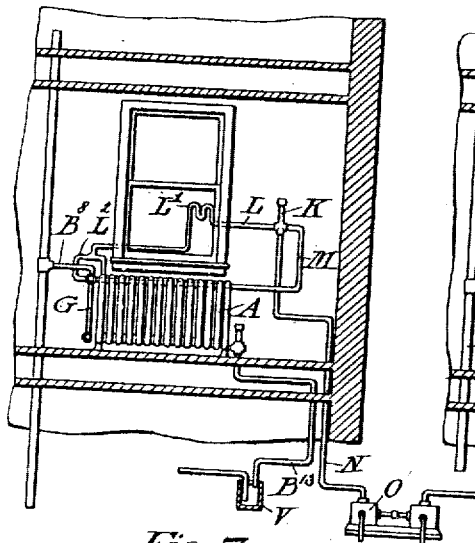
Figure 6:
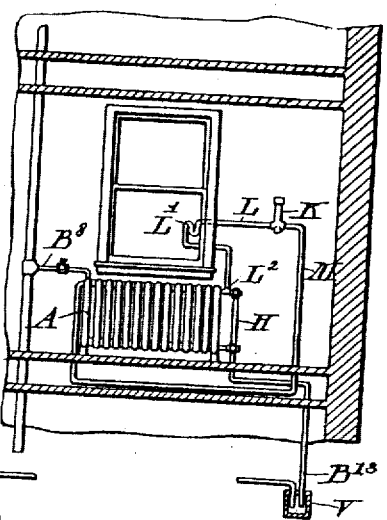
Figure 7:
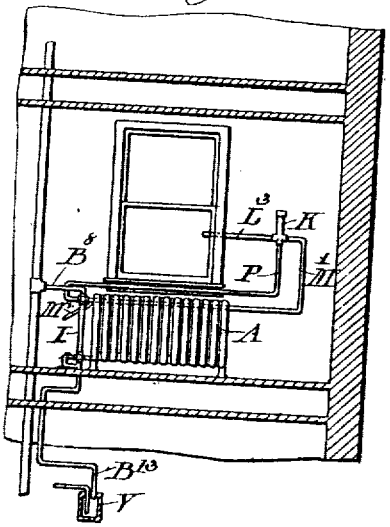
Figure 8:
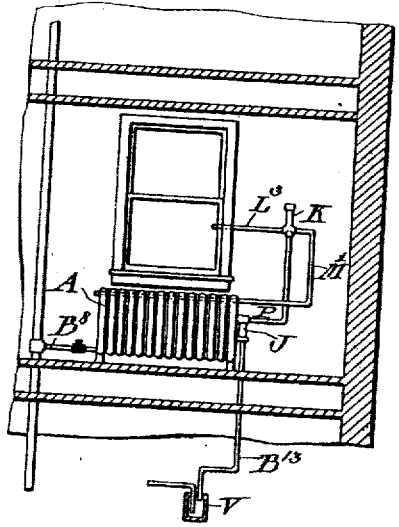
Figure 14:
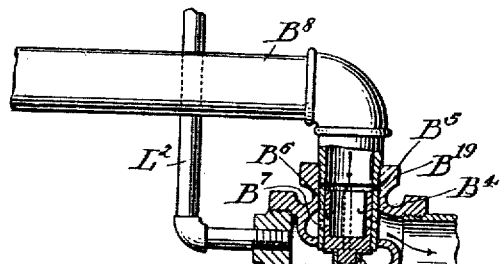
Figure 15:
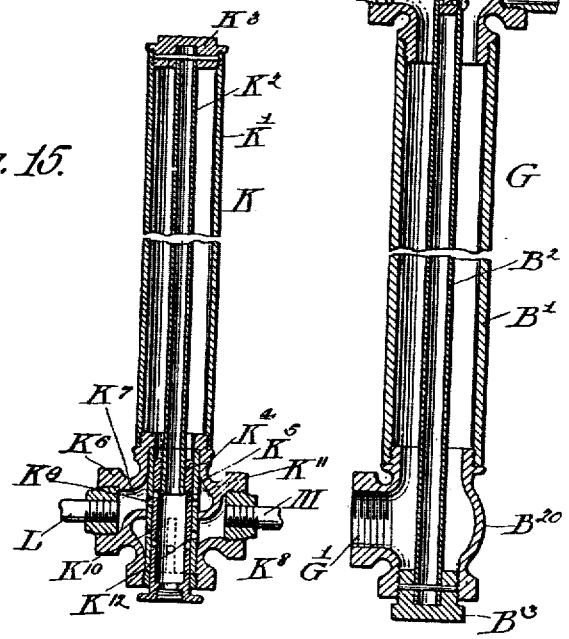
Figure 16:
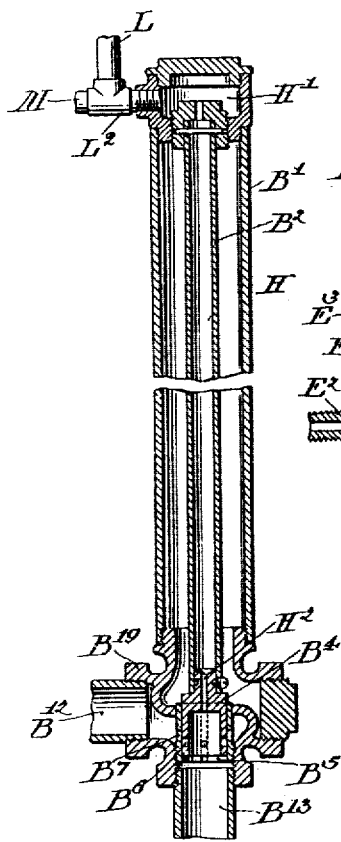
Figure 17:
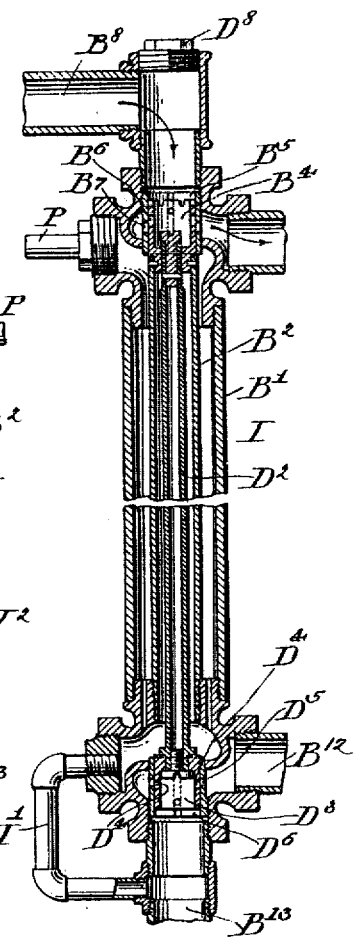
Figure 18:
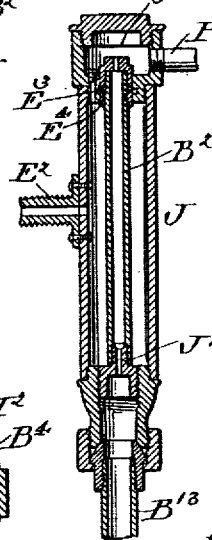

In the drawings, Figure 1 is a diagrammatic representation of a heating system in which the thermostatic actuated control valve is located in the heating fluid supply pipe; Fig. 2 is a view similar to Fig. 1 showing a system in which the control valve is located in the low pressure conduit leading away from the radiator; Fig. 3 is a view similar to Fig. 1 showing a system in which the controlling valve mechanism controls the connection between the supply pipe and the radiator and also between the radiator and the low pressure return conduit; Fig. 4 is a view similar to Fig. 1 of a system in which the thermostatic actuated valve is employed to control the escape of air from the radiator. This view also shows thermostatically controlled means for regulating the flow of the thermal agent acting on the thermostatic mechanism for the controlling valve; Fig. 5 is a view similar to Fig. 1 showing a different arrangement for acting thermally on the actuating mechanism of the control valve; Fig. 6 is a view similar to Fig. 2, but showing a different arrangement for acting thermally on the actuating mechanism of the control valve; Fig. 7 is a view similar to Fig. 3, but showing a different arrangement for acting thermally on the actuating mechanism of the controlling valve mechanism; Fig. 8 is a view similar to Fig. 4 showing a system in which the controlling valve regulates the escape of air from the radiator, but showing an arrangement for acting thermally on the valve actuating mechanism of the controlling valve different from that of Fig. 4. Fig. 9 is an elevation, partly in section, illustrating the thermostatic valve controlling the supply of the heating fluid to the radiator shown in Fig. 1. Fig. 10 is a sectional elevation of the thermostatic valve controlling the connection between the radiator shown in Fig. 2 and the low pressure return pipe. Fig. 11 is a sectional elevation of the thermostatic valve mechanism employed in controlling the supply of the heating fluid to and its escape from the radiator shown in Fig. 3. Fig. 12 is a sectional elevation of the thermostatic valve mechanism for controlling the escape of air from the radiator shown in Fig. 4. Fig. 13 is a diagrammatic representation of the thermostatically controlled motor operated fan arrangement for varying the flow of the fluid acting thermally on the thermostatic mechanism of the valve shown by Fig. 12. Fig. 14 is a sectional elevation of the thermostatic valve for controlling the supply of steam to the radiator shown in Fig. 5. Fig. 15 is a sectional elevation of the thermostatic pilot valve employed with the radiators shown in Fig. 5 to 8 inclusive. Fig. 16 is a sectional elevation of the thermostatically actuated valve for controlling the escape of the heating fluid from the radiator shown in Fig. 6. Fig. 17 is a sectional elevation of the thermostatic valve mechanism for controlling the supply of heating fluid to and its escape from the radiator shown in Fig. 7 and Fig. 18 is a sectional elevation of the thermostatic valve for controlling the escape of air from the radiator shown in Fig. 8.

Like reference symbols apply to like parts throughout the drawings.

In all the various forms of my invention, A indicates a radiator or heating unit; $B^8$ a pipe or conduit leading to the radiator from the steam or other heating fluid supply conduit; and $B^{13}$ the low pressure return pipe or conduit leading from the radiator to a low pressure chamber V receiving the water of condensation, air or steam etc. discharged from the radiator.

In the construction illustrated in Fig. 1, the pipe $B^8$ leads to the upper end of the controlling valve B. This valve, see Fig. 9, comprises an outer surrounding part $B^1$ preferably of a material having a low coefficient of expansion, such as iron, having valve parts $B^{19}$ and $B^{20}$ secured to its ends, and an inner part $B^2$, of a material having a high coefficient of expansion, such as brass. The inner member is fastened at one end to the outer member, or some part associated therewith, and, preferably, in such a manner as to permit relative adjustment of the parts $B^1$ and $B^2$, as by fastening the part $B^2$ to a nut $B^3$ adjustably connected to the valve part $B^{20}$. The inner or expanding member $B^2$ is connected to a hollow piston $B^4$ working in a casing or surrounding part $B^5$ secured in the part $B^{19}$. The piston $B^4$ is provided with ports or openings $B^6$ cooperating with ports or openings $B^7$ in the casing $B^5$. The positions of ports $B^6$ and $B^7$ are adjusted with respect to each other in accordance with the conditions met. When the ports $B^6$ and $B^7$ are in partial or complete register with each other, steam or other heating fluid, from the pipe $B^8$ passes through the ports into the coupling $B^9$ leading to the radiator. A conduit $B^{10}$ leads from the external atmosphere to the lower end of the valve and admits air from the external atmosphere into the chamber or space between the members $B^2$ and $B^1$. The air thus admitted to this chamber escapes from the valve through the open ended conduit $B^{11}$. The conduit $B^{11}$ is preferably arranged at its end so as to surround or be associated with the supply pipe $B^8$. By this arrangement the heat from the supply pipe tends to produce an aspirating effect, which assists in drawing the external air through the controlling valve. The operation of this form of my invention is as follows: The parts are so adjusted that in normal operation the ports $B^6$ and $B^7$ are in partial register, the amount which the ports overlap being sufficient to allow heating fluid to pass to the radiator at a rate just fast enough to keep the temperature of the apartment to be heated at the desired point. Upon a fall in external temperature, more heating fluid must be admitted to the radiator in order to maintain the desired apartment temperature. This is automatically taken care of by the contraction of the member $B^2$ resulting from the lower temperature of the air admitted to the valve through the pipe $B^{10}$. The contraction of the member $B^2$ of course results in bringing the ports $B^6$ and $B^7$ more nearly into complete register and thereby increases the flow of heating fluid to the radiator. When the external temperature rises, a reverse action takes place. It will thus be seen that the heating effect of the radiator shown in Fig. 1 is automatically varied in response to variations in the external atmosphere to keep the temperature of the apartment uniform and the cause which tends to produce a fluctuation in the temperature of the apartment is thus utilized to prevent such fluctuation. A further regulation of the radiator shown in Fig. 1 may be had through the valve $B^{21}$ controlling the connection between the radiator and the low pressure return pipe. If water of condensation or other relatively cold heating fluid is allowed to accumulate in the radiator, its heating effect is, of course, diminished.

In the arrangement shown in Fig. 2, the controlling valve C regulates the escape from the radiator of water of condensation or other relatively cold fluid. The valve C, (Fig. 10) is practically identical in plan and construction with the valve B, the parts being inverted, however.

When the ports $B^6$ and $B^7$ are in partial or complete register, discharge conduit $B^{12}$, directly connected to the radiator, is placed in communication with the conduit $B^{13}$. Any water or relatively cold fluid which may have accumulated in the radiator, then passes into the return pipe $B^{13}$ to make place for live steam or other hot fluid. The operation of the valve C is controlled by the external air passing from the conduit $B^{10}$ into the member $B^1$ from which it escapes through ports $B^{22}$ and $B^{23}$.

In the arrangement shown in Fig. 3, the controlling valve mechanism D, shown in detail in Fig. 11, governs the passage of live steam, or other heating fluid, to the radiator and also the escape of the water of condensation, or the like. The valve D comprises parts $B^1$, $B^2$, $B^4$, $B^5$ and $B^{19}$ which may be practically identical with those shown in Fig. 9. The piston $B^4$ has adjustably secured to it the upper end of the member $D^2$ which is axially disposed in the member $B^2$ and projects from the lower end thereof. The member $D^2$ is preferably of a material having a relatively low coefficient of expansion. To the lower end of the member $D^2$ is secured a piston $D^3$ sliding in a casing $D^6$ secured in the part $B^{20}$. The piston $D^3$ and casing $D^6$ are provided with ports $D^4$ and $D^5$ respectively which are brought into and out of more or less complete registry with each other to govern the connection of the radiator discharge pipe $B^{12}$ to the pipe $B^{13}$. With the construction described, the entrance of the heating fluid to the radiator and its escape therefrom are simultaneously controlled. To facilitate adjustment of the member $D^2$ relative to the member $B^2$ I provide the supply conduit $B^8$ with a removable plug $D^8$ through which tools may be inserted for entering the slots $D^9$, or the like, on the piston $B^4$ and the slot $D^{10}$ in the upper end of the threaded plug $D^{11}$ secured to the upper end of the member $D^2$ and threaded into piston $B^4$. It will be observed that the cold air from the conduit $B^{10}$ passes into the space between the members $B^2$ and $B^1$ through the ports $D^7$ and also into the space between the members $D^2$ and $B^2$ from the upper end of which it escapes through ports $D^{12}$, the expansible member $B^2$ thus having its inner and outer sides swept by streams of cold air.

The radiator shown in Fig. 4 is provided with a valve E, Fig. 12, for controlling the escape of air from the radiator. The valve is connected to the radiator by the hollow part $E^2$. The air from the radiator passes through the ports $E^2$ and $E^4$ into the member $B^2$ and thence to the return pipe. The air from the external atmosphere passes into the lower end of the member $B^1$ through the conduit $B^{18}$ and escapes from the upper end of the member $B^1$ through the ports $E^5$. With the form of my invention shown in Fig. 4, I have provided means for varying the flow of air from the external atmosphere to the valve in response to variations in the temperature of the apartment to be heated. The particular means disclosed for producing this effect comprises a fan having its outlet port connected to the conduit $B^{18}$ and its inlet port connected to the conduit $B^{10}$. The fan is operated by an electric motor $F^1$, the speed of which varies in response to variations in the temperature of the apartment heated. In Fig. 13 the speed controlling means for the motor are shown diagrammatically to consist of an expansive member $F^2$ provided with a contact piece $F^3$ moving over contacts $F^4$ connected by electric resistances $F^5$. When the temperature in the apartment falls, the member $F^2$ contracts, and contact $F^3$ short-circuits some of the resistances $F^5$ which are in the motor circuit. This speeds up the motor and increases the air from the external atmosphere forced to flow by the member $B^2$. This of course hastens the movement of the port $E^4$ relative to the port $E^3$ and also controls the extent of movement, since the port $B^2$ receives heat by conduction from the radiator, and also by radiation from the radiator and the room atmosphere; and its resultant temperature is influenced, therefore, not only by the temperature of the stream of air entering the valve through the conduit $B^{18}$ to act on the thermostatic valve actuation mechanism, but also by the rate of flow of this stream of air. It is, of course, obvious that this or other means may be employed for varying the flow of air from the external atmosphere into the valves B, C and D.

The valve G, Fig. 14, which controls the supply of heating fluid to the radiator shown in Fig. 5, is essentially the same in general construction as the valve B, of Figs. 1 and 9. The means for supplying the temperature changing fluid to the space between the members $B^1$ and $B^2$ differ materially, however. In this form of my invention, a thermostatic pilot valve K, see Fig. 15, is employed. The valve K comprises an outer tubular member $K^1$ of a material having a relatively high coefficient of expansion, in connection with a member K² having a relatively low coefficient of expansion. The upper end of the member K² is secured to a plug K³ adjustably screwed into the upper end of the member K¹. The lower end of the member K² supports a piston K⁴ sliding in a tubular casing K⁵ secured in a valve part K⁶. The valve part K⁶ is provided with upper and lower valve chambers K⁷ and K⁸. Ports K⁹ and K¹⁰ formed in the casing K⁵ in conjunction with ports K¹¹ and K¹² formed in the piston K⁴ are employed for interchangeably placing the interior of the hollow piston K⁴ in communication with the valve chambers K⁷ and K⁸. When the temperature of the apartment is below the normal apartment temperature, the ports K⁹ and K¹¹ are brought into more or less complete registration. Similarly, when the apartment temperature rises above a predetermined point, the ports K¹⁰ and K¹² are brought into more or less complete registration. A conduit L leads from the valve chamber K⁷ to a conduit L², which is in communication with the upper end of the valve G. The conduit L includes a coil L¹ located without the apartment and subject to the temperature of the external atmosphere. The valve chamber K⁸ is connected to the conduit L² by a conduit M, a portion of which passes in close proximity to the radiator. The lower end of the hollow piston K⁴ is connected by a conduit N with a source of air under pressure, such as the pump O. When the thermostatic valve K has its ports, K⁹ and K¹¹ brought into register, compressed air from the pump O forces air into the upper end of the valve G. This air, which is cooled by passing through the coil L¹, flows between the members B¹ and B², contracts the latter and brings the ports B⁶ and B⁷ into more or less complete register, thus admitting live steam or other heating fluid to the radiator. When, thereafter, the temperature of the apartment rises sufficiently, the communication between the conduit M and the valve chamber K⁸ is closed by the movement of the piston K⁴ resulting from the expansion of the member K¹. This of itself allows the member B² to warm up and shut off the supply of the heating fluid to the radiator. If the temperature of the apartment continues to rise, however, the expansion of the member K¹ brings the ports K¹⁰ and K¹² into register and air is then forced into the upper end of the valve G from the conduit M. This air, being heated by its proximity to the radiator, acts very rapidly upon the valve G to cause it to cut off connection between the supply conduit B⁶ and the radiator. With this arrangement it will be observed that the main control valve G has its thermostatic actuating mechanism operated upon to open connection between the radiator and the source of heating fluid by a stream of cold air, the flow of which is controlled by the temperature of the apartment heated, thus rapidly opening the controlling valve when necessary. As both of the valves G and K are throttle valves, the increase in heating effect of the radiator is effected not only by the amount of variation of the room temperature from the normal, but also by the temperature of the external atmosphere, the effect of the stream of cold air on the member B² being a function of the amount of air flowing and its temperature. The provision of the hot air supply conduit M permits of a very rapid closing of the main valve when the temperature rises above a predetermined point.

The valve H, see Fig. 16, which controls the escape of water of condensation of other cooled heating fluid from the radiator A of Fig. 6 is practically the same in construction as the valve C, but differs, however, in the fact that the fluid for action thermally on the member B² passes from a chamber H¹ at the upper end of the valve into the interior of the member B² and is drawn therefrom into the return pipe B¹³ through a port H² formed in the upper end of the hollow piston B⁴. In this form of my invention, the conduits L and M are connected by a coupling L³ leading to the chamber H¹, as in the construction of Fig. 5. The conduit N and pump O are dispensed with, however, air being drawn through the hollow member B² into the return pipe B¹³, from the conduits L and M whenever the variations in the apartment temperature bring the ports K⁹ and K¹¹ or K¹⁰ or K¹² (see Fig. 15) into register and thus place the pipes L or M in communication with the interior of the hollow piston K⁴ which in this form of my invetnion is open to the atmosphere. With this form of my invention, a positive flow of air acting thermally on the actuating mechanism of the main valve is obtained in a very simple manner by the connection described to the return pipe, thus obtaining all the advantages of the construction shown in Fig. 5 while eliminating the extra conduits and source of compressed air.

In the construction shown in Fig. 7, the valve I, Fig. 17, employed for controlling the supply to and escape from the radiator of the heating fluid, is practically identical with the valve D of Figs. 3 and 11. The spaces into which the air acting on the thermostatic actuating mechanism of this valve passes, are connected at their lower ends to the return pipe B¹³ by the connection I¹. Air is supplied to the upper end of these spaces from a conduit P which is connected to the lower end of the hollow piston K⁴. The valve chamber K⁷ has connected to a conduit L³ leading from the external atmosphere and the valve chamber K⁸ has connected to it a conduit M¹, the other end of which is open and a portion of which is in proximity to the radiator. In this form of my invention, cold air flows to the actuating mechanism of the valve I through the conduits L¹ and P and warm air flows to the valve through the conduits M¹ and P.

In the form of my invention shown in Fig. 8, the main controlling valve J, which controls the escape of air from the radiator is practically identical with the valve E of Figs. 4 and 12, differing from that valve, however, in that the controlling air is delivered by the conduit P to the chamber J¹ in communication with the interior of the member B², the lower end of which is in communication with the return pipe B¹³ through the port J². Hot or cold air is supplied to the chamber J¹ through the conduit P in the same manner as in the construction shown in Fig. 7.

While I have hereinbefore described somewhat in detail a number of forms in which my invention may be embodied, it will be readily understood by all those skilled in the art that changes may be made in the forms disclosed without departing from the spirit of my invention and particularly that some features of my invention may be employed without a corresponding use of others and that the various novel features disclosed may be employed in different arrangements from those set forth.

The novel methods of controlling the heating capacity of heat radiating devices, disclosed but not claimed herein, form the subject matter of my prior applications, serial numbers 158,039 and 158,040, filed on the 20th day of May, 1903, which disclose the apparatus forming the subject-matter of the present application.

Having now described my invention, what I claim as new and desire to secure by Letters Patent is

1. In a heating system, a radiator, a heating fluid supply conduit and a low pressure return conduit connected to said radiator, a valve controlling the flow of the heating fluid through the radiator and thermostatic actuating mechanism for the valve having a chamber or passage in communication with a source of air and including a member having a relatively high coefficient of expansion in proximity to said chamber or passage and a conduit leading from said chamber to said low pressure return conduit.

2. In combination, a radiator for heating an apartment, a throttling valve controlling the flow of a heating fluid therethrough, thermostatic actuating mechanism for the valve, means for subjecting said mechanism to the action of a thermal agent varying in temperature with the external atmosphere and means for varying the influence of said thermal agent on said mechanism in response to variations in the temperature of the apartment to be heated.

3. In a heating system, a radiator for heating an apartment, a heating fluid supply conduit and a low pressure return conduit connected to said radiator, a valve controlling the flow of heating fluid through the radiator, thermostatic actuating mechanism for the valve having a chamber or passage and including a member having a relatively high coefficient of expansion in proximity to said chamber or passage, means responsive to the temperature of the apartment heated for opening and closing said chamber to a source of air and a conduit leading from said chamber or passage to said low pressure return conduit.

4. In combination, a radiator for heating an apartment, a throttling valve controlling the flow of the heating fluid through said radiator, thermostatic actuating mechanism for the valve, means for causing a stream of a fluid thermal agent to flow past, against and by said mechanism to change the temperature of the latter in passing, and means for varying the flow of said stream without changing its direction in response to variations in the temperature of the apartment to be heated.

5. In combination, a radiator, a throttling valve controlling the flow of heating fluid through said radiator, thermostatic actuating mechanism for the valve, means for causing a stream of air varying in temperature with the external atmosphere to flow against and by said actuating mechanism and means responsive to the temperature of the apartment to be heated for controlling said stream.

6. In combination, a radiator, a source of heating fluid, a conduit leading from said source to said radiator, a low pressure return conduit leading away from the radiator, a valve controlling the flow of the heating fluid through the radiator, thermostatic actuating mechanism for said valve, including a chamber or passage, a conduit leading from said chamber to said return conduit and a conduit leading to said chamber from a source of supply of a fluid thermal agent for acting on said thermostatic actuating mechanism.

7. In combination, a radiator for heating an apartment, a source of heating fluid, a conduit leading from said source to said radiator, a low pressure return conduit leading away from the radiator, a valve controlling the flow of the heating fluid through the radiator, thermostatic actuating mechanism for said valve including a chamber or passage, a conduit leading from said chamber to said return conduit, a conduit leading to said chamber from a source of supply of a fluid agent for acting thermally on said thermostatic actuating mechanism, and means responsive to the temperature of the apartment to be heated for varying the flow of fluid through said chamber.

8. In combination, a radiator for heating an apartment, a source of heating fluid, a conduit leading from said source to said radiator, a low pressure return conduit leading away from the radiator, a valve controlling the flow of the heating fluid through the radiator, thermostatic actuating mechanism for said valve including a chamber or passage, a conduit leading from said chamber to said return conduit, a conduit leading to said chamber from a source of supply of a fluid agent for acting thermally on said thermostatic actuating mechanism, and a thermostatic pilot valve responsive to the temperature of the apartment to be heated for controlling the flow through said chamber.

9. In combination, a radiator, a source of heating fluid, a conduit leading from the source to the radiator, a low pressure return conduit leading away from the radiator, a valve controlling the flow of the heating fluid through said radiator, thermostatic actuating mechanism for said valve, including a chamber or passage, a conduit leading to said chamber from a source of air varying in temperature with the external atmosphere for acting thermally on said thermostatic actuating mechanism, and a conduit leading from said chamber to said return conduit.

10. In combination, a radiator for heating an apartment, a source of heating fluid, a conduit leading from the source to the radiator, a low pressure return conduit leading away from the radiator, a valve controlling the flow of the heating fluid through said radiator, thermostatic actuating mechanism for said valve, including a chamber or passage, a conduit leading to said chamber from a source of air varying in temperature with the external atmosphere for acting thermally on said thermostatic actuating mechanism, a conduit leading from said chamber to said return conduit, and means for varying the flow of air through said chamber in response to variations in temperature of the apartment to be heated.

11. In combination, a radiator for heating an apartment, a source of heating fluid, a conduit leading from the source to the radiator, a low pressure return conduit leading away from the radiator, a valve controlling the flow of the heating fluid through said radiator, thermostatic actuating mechanism for said valve, including a chamber or passage, a conduit leading to said chamber from a source of air varying in temperature with the external atmosphere for acting thermally on said thermostatic actuating mechanism, a conduit leading from said chamber to said return conduit and a thermostatic pilot valve responsive to the temperature of the apartment to be heated for varying the flow to said chamber from said source.

12. In combination, a steam heating device and means for supplying steam thereto, a low pressure return pipe, a valve connecting said pipe to said radiator and controlling the escape from the radiator to the pipe of steam and water of condensation, thermostatic actuating mechanism for the valve, a thermostatic pilot valve responsive to the temperature of the apartment heated, and means governed by it for causing air drawn from the external atmosphere in an amount varying in a predetermined manner in accordance with variations in the temperature of the apartment heated to flow through or by said actuating mechanism to act thermally thereon.

13. In combination, a radiator, means for supplying steam thereto, a low pressure return pipe connected to said radiator, a valve in said pipe controlling the passage of steam and water of condensation from the radiator through the return pipe, thermostatic actuating mechanism for the valve including a chamber, a passage leading from said chamber to the return pipe, a conduit for supplying air varying in temperature with the external atmosphere to said chamber to act thermally on said mechanism and thermostatically controlled means for varying the flow of said air through said conduit in response to variations in the temperature of the apartment to be heated.

14. In combination, a radiator, means for supplying steam thereto, a low pressure return pipe, a throttling valve for opening and closing connection between the radiator and the return pipe, thermostatic actuating mechanism for the valve, including a chamber in communication with the return pipe, a conduit leading to said chamber from the external atmosphere, a valve controlling the flow of air through said conduit to said chamber to act thermally on said mechanism, and means actuating said valve to vary the flow of air from the external atmosphere through the conduit as the temperature of the apartment to be heated falls and rises.

HARRY C. MALLORY.

Witnesses:
I. VERNON CAMPBELL,
R. E. FOX, Jr.